United States Patent [19]

Burke et al.

[11] 4,449,017
[45] May 15, 1984

[54] ACD COMBINED HANDSET AND HEADSET ARRANGEMENT

[75] Inventors: Edmund T. Burke, West Long Branch; Joseph F. Catalano, Holmdel; James A. Henderson, Jr., Neptune; Nicholas K. Smith, Middletown, all of N.J.

[73] Assignee: Bell Telephone Laboratories, Incorporated, Murray Hill, N.J.

[21] Appl. No.: 383,314

[22] Filed: May 28, 1982

[51] Int. Cl.³ .............................................. H04Q 3/64
[52] U.S. Cl. ................................ 179/27 D; 179/84 T
[58] Field of Search ............... 179/81 B, 100 L, 84 C, 179/99 P, 99 R, 99 M, 27 D, 27 FB, 27 FH, 27 CA, 42, 84 T, 84 A, 84 R

[56] References Cited

U.S. PATENT DOCUMENTS

| | | | |
|---|---|---|---|
| 3,147,345 | 9/1964 | Busala et al. | 179/81 B |
| 3,571,518 | 3/1971 | Chipman et al. | 179/27 FH |
| 3,985,976 | 10/1976 | Cowpland et al. | 179/81 B |
| 4,046,972 | 9/1977 | Huizinga et al. | 179/99 M |
| 4,172,967 | 10/1979 | Porter et al. | 179/81 B |

Primary Examiner—Thomas W. Brown
Attorney, Agent, or Firm—David H. Tannenbaum

[57] ABSTRACT

When a standard business office communication system is combined with ACD features, it is necessary to design the system to accommodate a variety of operational modes. Two such modes are handset operation, where a station user talks and listens via a conventional hand-held instrument, and headset operation where the user has an earphone and mouthpiece supported by the head. In headset operation, the station is made to appear off-hook permanently and incoming calls are signaled by a short burst of audio tone followed by an automatic connection to the called party. In handset operation, ringing signals must be applied to the station, and these signals continue until the incoming call is answered by a subsequent off-hook condition of the station. The disclosed arrangement allows each station to operate in either mode on a per call basis.

13 Claims, 10 Drawing Figures

ACD COMBINED HANDSET AND HEADSET ARRANGEMENT

BACKGROUND OF THE INVENTION

This invention relates to a telephone communication system for providing automatic call distribution (ACD) for calls incoming to the system.

Typically, ACD systems are designed for heavy usage where attendants, working at consoles, answer calls incoming to the system from a number of sources. In such systems the attendants are arranged into splits with each split performing a specialized work function.

One characteristic of ACD systems is the primarily incoming nature of the ACD calls which are placed in a queue to be answered by a next available attendant. Thus, to conserve time and to free the attendant's hands, a headset is used. Under such operation, a special audible tone is applied to the headset and the call is completed to the desired attendant automatically at the application of the audible (zip) tone without action being necessary by the attendant. This operation differs from the conventional answering mode where ringing signals are applied, on a periodic repetitive basis, until the attendant takes some action, usually by removing the handset from the switchhook. In these situations, only after the handset has been lifted is the call completed through to the attendant.

In some situations it is desired to have the attendants free to move from one station to another and to answer calls from any station; these calls may be ACD calls or regular incoming-outgoing calls. This type of system is particularly convenient in situations where attendants may be called upon to perform a number of other chores, such as the operation of a cash register or waiting on customers.

In such situations it is often inconvenient to require the attendant to walk around wearing a headset. Thus, it is desirable to have a telephone system in which calls may be completed to a station either in the headset mode or in the handset mode depending upon the status of the station at the time of call assignment.

Problems exist, however since for headset operation only one application of tone is applied, with a volume only loud enough to be heard directly in the ear of the attendant, while for handset operation higher power or a different ringing structure is required on a recurring basis. Thus, while it is not a simple matter to have the attendant plug a headset into a jack to convert from headset to handset operation, it is desirable to arrange a system to operate in that fashion.

A further problem exists when it is considered that it is highly uneconomical to require modifications to existing telephone station sets and to wiring plans in order to accommodate the desired result. Thus, it is not practical to send signals, other than existing signals, back and forth between the station set and the central processor in order to determine the status of the telephone set.

SUMMARY OF THE INVENTION

We have arranged an electronic telephone system with the capability of determining, on a call-by-call basis, the headset/handset status of the station set to which a particular call is directed. Once such a determination is made the call is completed to the station in the proper fashion. Thus, assuming headset operation, the special (zip) tone is applied over the T-R leads extending to the station. In handset operation, where the headset is not plugged in, regular ringing tone is applied to the station via the serial data leads. The system operates by monitoring the on-off hook status of the station. A periodic system task scans each station several times a second and stores the current state of the switchhook in the status memory data structure, SEIO. If the station, at the time a call is assigned, is off-hook an assumption is made that the station is in the headset mode. Stations in headset mode appear to be permanently off-hook. If this headset mode assumption proves incorrect, i.e., the handset had been inadvertently off-hook, only one call will be completed to the station, before corrective action is taken. It should be noted that it is possible to keep the handset off-hook and use the handset in the headset mode, i.e., without requiring an affirmative off-hook signal.

BRIEF DESCRIPTION OF THE DRAWING

The solution to the foregoing problems, together with the operation and utilization of the present invention, will be more fully apparent from the following description taken in conjunction with the drawing, in which.

GENERAL DESCRIPTION BACKGROUND

Before beginning a general discussion of the specific features claimed it may be helpful to review in general terms the operation of an overall system in which the claimed feature can be utilized. It should be borne in mind that such a feature can be used in any number of similar type systems and thus background information on only one type of system will be presented. In addition, since communication system features may be used with different types of systems each dependent on different hardware constraints and upon different programming techniques, no attempt will be made to detail all of the steps used to control the overall system, as such would cloud the issue and unnecessarily lengthen this specification. Quantities mentioned were engineered for particular time and memory requirement and will not be the optimum for all such systems.

It will of course be obvious to one skilled in the art that in order for the feature described and claimed herein to be used with any communication system, the feature must be blended into the overall structure of the system in which it is used and must be tailored to mesh with all of the other features and operations of such a system. Thus, in order to avoid confusion and in order to allow those skilled in the art to utilize the invention claimed herein, this patent specification will concentrate on providing an understanding of the problems and constraints typically found in a communication system where the feature may be used. The patent specification will provide the logical steps necessary for the implementation and blending of the described feature into such a larger system, having many such features.

TYPICAL OVERALL SYSTEM OPERATION

Figure 1:
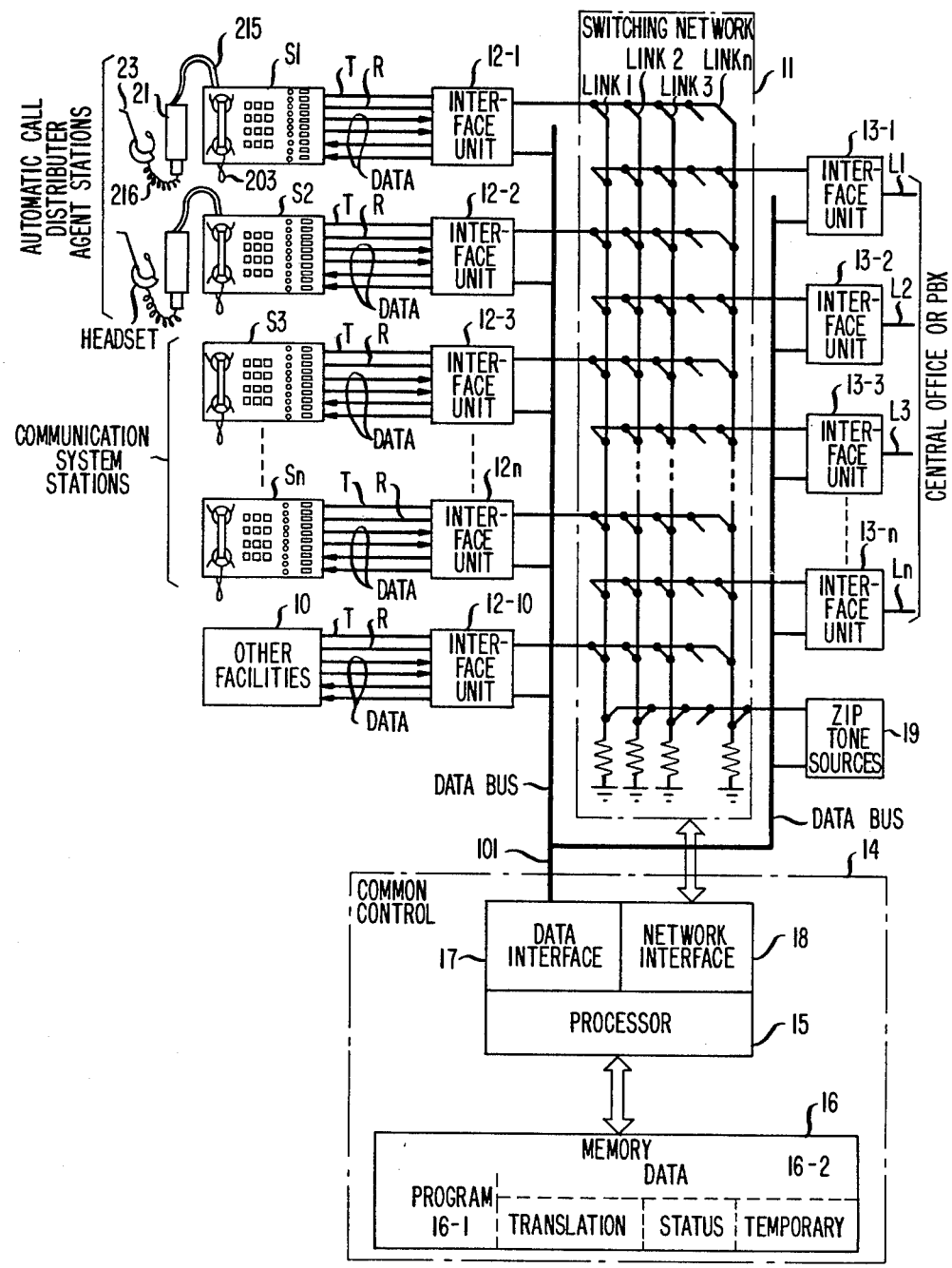
FIG. 1 shows a pictorial view of a telephone system to which headset/handset operation has been added.

One such communication system where the structure claimed herein can be used is a station oriented solid-state, stored program control, business communication system. FIG. 1 shows a block diagram of such a system which combines the usual key system features (hold, visual indication, etc.) with many features only recently available.

These features are fully detailed in five issued U.S. patents, each directed to a different operational feature of a communication system. These patents are Allison et al, U.S. Pat. No. 4,109,113; Fenton et al, U.S. Pat. No. 4,150,259; Fenton et al, U.S. Pat. No. 4,150,257; Nahabedian, U.S. Pat. No. 4,125,748; and Densmore et al, U.S. Pat. No. 4,291,199. These five patents are incorporated by reference as though they were each reproduced in their entirety herein.

Call processing in the system is under the control of processor 15 in common control 14. Each station, such as Station S1, and line port, such as 13-1, is scanned to detect any changes in status. In response to any change (e.g., on-hook, off-hook, button depression, etc.), the processor, per instructions in the stored program in memory 16 translates these changes into system commands. The system also generates commands via a bidirectional data bus 101 to the multibutton electronic telephone (MET) set, shown in detail in FIG. 2, to light the light emitting diodes (LEDs) and ring the tone ringer associated with the MET set. All of the MET sets provide TOUCH-TONE dialing, tone ringing, and LED indications. The LED indicators will be discussed hereinafter. The tone ringer provides two distinctive audible signals - low-pitched tone ringing to indicate incoming CO calls and high-pitched tone ringing to indicate incoming station-to-station (intercom) calls.

Nonbutton key sets can be used as station positions where only station-to-station (intercom) calling and/or outward dialing, via dial access pooled facilities or a central answer position, are required. In this implementation the first (lower) 4 buttons on each MET station set are always the same. They are: Hold, ±, and two system access buttons, each associated with the intercom number of the particular station. The ± feature is described in the aforementioned patent of Fenton et al. The system access buttons are used to receive calls from other stations within the communication system (intercom) and to originate such calls or to access system facilities such as lines, paging ports, etc. Incoming calls may terminate on either system access button depending on their busy/idle status. If the lower one is busy, a second incoming call comes to the second (upper) one, giving a visual call waiting indication accompanied by a single audible ring if the station is off-hook. The system access buttons are also used in conferencing and call transfer features such as described in the aforementioned patent of Nahabedian et al. The remainder of the buttons on the MET station sets are flexible buttons and can be assigned to any of the button-activated station or answering position features, such as call coverage, as shown in the aforementioned patent application of Fenton et al, and pooled line treatment, as shown in the aforementioned patent application of Allison et al.

As shown in FIG. 1 there are three pairs of wires coming out of the electronic key telephone set to the interface unit: T&R, data in, data out. The T&R pairs are connected to switching network 11. In the example shown a space division network with n links is shown. It may be replaced by a time division network with n time slots. The data link between the set and the processor is used to transmit information to the processor which will configure the switching network and send LED control signals back to the telephone sets accordingly. System facilities, such as system facility 10, is understood to include origination registers, tone circuits, stations, lines, trunks or any port which can be communication coupled to a link of the network.

Common control 14 consists of processor 15, interface units 17 and 18 and memory 16. The memory unit consists of a program store 16-1, and a data store 16-2. The data store is subdivided into the following:

A. Translation which contains the hardware configuration data. For example, the button assignments and station class or service.
B. Status which stores the state of the system at a given moment. For the station, it contains
  (a) Station state: switchhook; ± operation; whether actively connected to the network or not. (Data structures SEIO and SBLP in status memory 16-2.)
  (b) Button state: for each button
    (i) if I-USE is on
    (ii) what is the green status LED state (Data structure SELS in memory 16-2)
    (iii) which link is associated with calls on this button. (Data structure SBLP in memory 16-2.)
C. Temporary Data which is used to process a call and is a scratch-pad area.

A typical common control processor works on a 25 ms work cycle. A high level executive program, TSK_DSP, controls the order of tasks executed in a work cycle. At the beginning of each cycle, a hardware real time interrupt is received by the processor. The interrupt handling routine sets a flag and returns to the interrupted task which in turn will relinquish control to the executive program, TSK_DSP, as soon as it reaches a convenient break point. The task dispenser decides which task is to be executed next according to a schedule. Basically these tasks fall into three categories:

(1) Scan: Scan for physical changes (e.g., a new button depression by a station). If a change is detected and confirmed, it will be stored in a temporary buffer to be processed later.
(2) Process: After all scans are completed, changes will be processed.
(3) Maintenance: If there is time left in the 25 ms cycle, the system will perform routine maintenance functions until the next work cycle begins.

The following features can be implemented by the system discussed herein.

I-USE INDICATION

Figure 2:
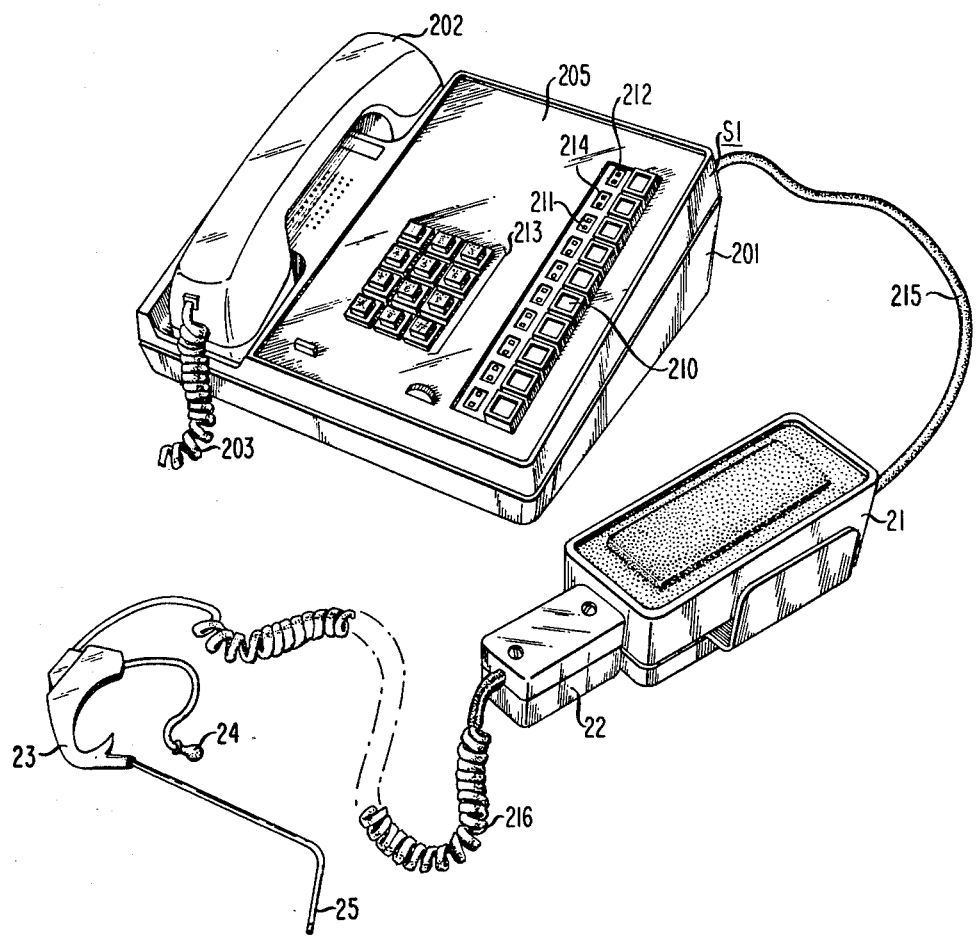
FIG. 2 shows a pictorial view of one station set to which a headset has been connected.

This feature provides a red I-Use LED, such as LED 212, FIG. 2, associated with each line access button (tracking feature, system access, pooled facilities access, personal line access, automatic intercom, and call coverage). When off-hook, this LED indicates the line to which the station is connected. When on-hook, this LED indicates the line to which the station would be connected upon going off-hook.

LINE STATUS INDICATION

Call status indications are given by means of a green status LED such as LED 211, FIG. 2, associated with each line access button (tracking feature, system access, pooled facilities access, personal line access, automatic intercom, and call coverage). The status LED flashes (500 ms on, 500 ms off) during the ringing state, lights steadily during the busy state, and winks (450 ms on, 50 ms off) during the hold state.

AUTOMATIC INTERCOM

Automatic intercom is provided by a 2-way point-to-point voice path between two designated MET stations with automatic signaling of the called station. Upon depressing an automatic intercom button and going off-hook, the calling station user hears ringback and the called station receives the standard station-to-station distinctive alert. The status LED associated with the automatic intercom button is steady at the calling station and flashing at the called station. The called station user may answer the call by depressing the automatic intercom button and going off-hook.

DISTINCTIVE ALERT

Distinctive alerting allows the station user to distinguish between incoming CO calls and incoming station-to-station calls. One tone is used as the alert for incoming CO calls extended by the attendant or on a personal CO line. A second higher frequency tone serves as the audible alert for station-to-station (intercom) calls. Each of these signals has a repetition period of 4 seconds with a 1-second on-time and a 3-second off-time. These tones are controlled by data sent to each station over the data bus.

PERSONAL LINE ACCESS

This feature provides a communication channel between a station user and a dedicated outside line via the switching network. Unlike pooled facilities, which can also be accessed by dial codes, personal lines are only accessible by means of a dedicated access button, which provides incoming as well as outgoing service.

A personal line may be shared by as many as eight stations by providing each of these stations with the associated personal line access button. Because of the conference limit, however, no more than five parties may be on any given call. Any attempt by a sixth station to bridge on will be ignored (i.e., handled as an excluded station). Full common audible ringing may be provided optionally to any or all stations sharing the line. Control of the line with respect to call coverage features is available to only one designated station.

POOLED FACILITIES—BUTTON ACCESS

Upon depressing a pooled facilities access button and going off-hook, the station user is connected to an idle line facility belonging to a common pool of outside lines (e.g., CO, FX, WATS, etc.). The status and I-Use LEDs associated with the pooled facilities access button will light steadily, and the station user will be free to complete the call. If no idle facilities are available (facilities by indication), a user's attempt to originate will simply be denied and the I-use indication will be extinguished. A station requiring button access to several line pools may be equipped with a separate access button for each of the required pools. Each line pool may optionally be assigned a dial access code, permitting selection of an idle line from the pool by dialing the code after having originated on a system access button. Reorder tone will be returned if no lines in the selected pool are idle.

FACILITIES BUSY INDICATION

This feature keeps the station user informed of the availability of any of the idle lines in any pooled facility group accessible to the station by means of a pooled facility access button. The status LED associated with a pooled facility access button will indicate busy whenever all the lines within the associated pool are busy, as well as when a line in the pool is being used at a given station.

PRIME LINE PREFERENCE

This feature automatically connects the station user, upon going off-hook, to the line designated as the prime line. A station user may override this preference by preselecting another line or depressing the HOLD button prior to going off-hook. If ringing line preference is also in effect at a given station, that feature takes precedence.

RINGING LINE PREFERENCE

For an on-hook station, this feature automatically selects a line access button which has a call ringing the station set. If two or more lines are ringing simultaneously, the station user is connected to the first line to start ringing. If the user wishes to use a different line, the line must be preselected prior to going off-hook. Once a station is off-hook, ringing line preference will be canceled on any subsequent call until the user returns to the on-hook state. If ringing ceases while the station user is still on-hook, line preference reverts to whichever option is applicable—no line or prime line.

STATION-TO-STATION CALLING

This feature allows a station user to directly dial other stations within the system without the assistance of the attendant. This is accomplished by selecting an idle system access button and dialing the intercom code of the desired station.

Other communication systems in which these features could be used are shown in U.S. Pat. No. 3,660,611. issued May 2, 1972, in the name of Knollman et al, and in U.S. Pat. No. 4,046,972, issued Sept. 6, 1977, in the name of Huizinga et al, which patent also shows the multibutton electronic set, which patent describes the items designated by number in FIG. 2. The switching network and line circuits shown in FIG. 1 can be of the type shown in U.S. Pat. Nos. 3,991,279 and 3,991,280, both issued Nov. 9, 1976, and in co-pending application of J. J. Shanley, U.S. Ser. No. 846,162, filed on Oct. 27, 1977, now U.S. Pat. No. 4,110,566.

GENERAL DESCRIPTION

In the status memory (FIG. 1, item 16-2) there is stored for each button on each station set the following information:
 (a) The instantaneous state of each LED (on/off) for the two LEDs associated with the button (in a data structure station lamp state output table (SLSO));
 (b) the long term state of each LED (flash, wink, on, off) called the station MET lamp status table (SELS).

Also, for each station set, there is a status memory location for recording:
 (c) the last detected instantaneous state of the station's switch-hook and buttons which is part of station MET input/output table (SEIO);

(d) the desired state of the station's tone ringer (on/off, volume setting, frequency setting) which is part of data structure SEIO.

Periodically, the processor (FIG. 1, item 15) takes the information in (b) and uses it to update the instantaneous information in (a).

Figure 5:
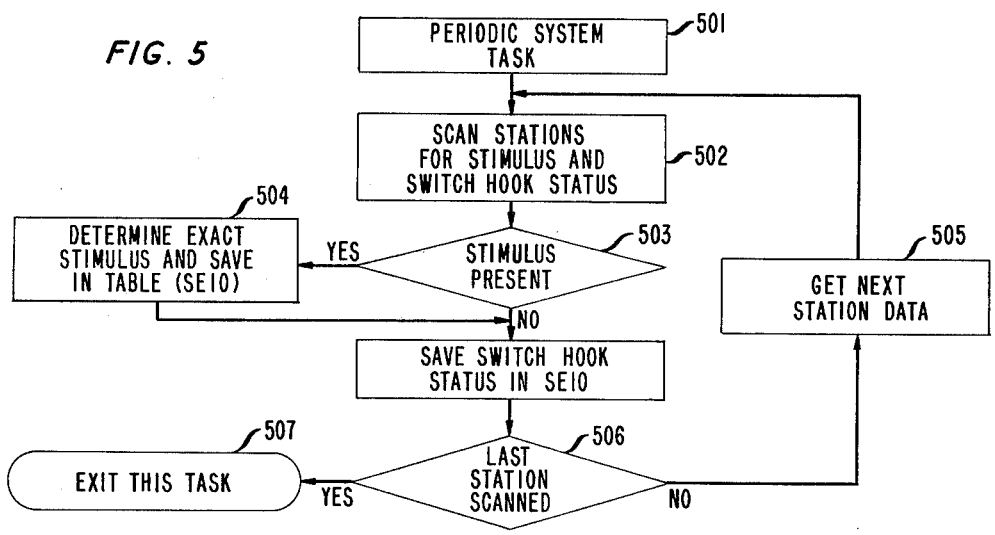

Periodically in the scan cycle, the processor takes the information in (a) and (d) and assembles it into a single long message for a single station in the format required by the MET station set. This data is transmitted to the MET using the data interface (FIG. 1, item 17). The MET returns to the processor, via the data interface, the instantaneous state of its switch-hook and buttons (FIG. 5).

The returned data is compared with that in (c) above and if there are any changes, records these in a temporary buffer for that station. At a different time, another processor action picks up this stimulus and causes the appropriate feature actions to be initiated in response to that stimulus.

Whenever the processor program wishes to turn on or off an LED on a MET, or set it to wink or flash, it writes the appropriate bits into the status memory described in (b) and this function will automatically occur as a consequence of the two periodic actions described above.

For each button, there is a translation record stored in the translation memory (16-2 of FIG. 1). For a normal non-ACD station the translation is stored in the station button identification table (SBID); for ACD stations (not the system supervisor) the information is stored in the station ACD feature button table (SAFB); and for that ACD system supervisor the information is stored in the supervisor station ACD feature button table (SSAFB). This information is coded in numerical forms, e.g., a value of 1 identifies a personal line button, a value of 2 identifies a pooled line button, 3 identifies a track button, etc.

For a speech-type button (e.g., system access, auto-intercom, personal line, pooled line, call coverage, etc.), there are 4 possible states which will be shown to the user on the status LEDs: Namely, busy—(LED on steady), idle—(LED dark), Ringing—(LED flash), and hold—(LED wink).

This information is stored in the status data memory (16-2 in FIG. 1) coded in numerical forms. For a non-speech-type button like message-waiting, the same data format is used although the valid states may reduce to 2 (busy and idle).

As described, the scan routine (FIG. 5) in the system detects and reports a button push by the MET user to a buffered area to wait for the process routines to process. When such a change is processed by the process routines, the button identification information, SBID or SAFB or SSAFB, stored in 16-2 is first checked, then the SEIO, SBLP, SELS, stored 16-2 is checked. The processor is thus able to interpret the button push to a specific user command and uses the proper programs stored in 16-1 to process the change. For example, button selection of (1) an idle (from SBLP or SELS) speech-type (from SBID, SAFB or SSAFB) button implies call origination requiring the associated facilities.

(2) a ringing (from SELS) speech-type (from SBID or SAFB or SSAFB) button implies answer a ringing call.

DETAILED DESCRIPTION

Turning now to FIG. 2, there is shown a station set S1 having attached thereto a headset adapter 21 which is arranged to accept jack plug 22 from headset 23. The headset contains an earpiece speaker 24 and a mouthpiece transmitter 25. When an attendant desires to operate in the headset mode, plug 22 is inserted into adapter 21. When the attendant desires to use station S1 in the handset mode, plug 22 is removed and the station reverts to typical handset operation where handset 202 is used for communication purposes.

Of course, it is obvious that adapter 21 could be contained within station S1 and plug 22 could be inserted directly into an appropriate jack on station S1.

Figure 3:
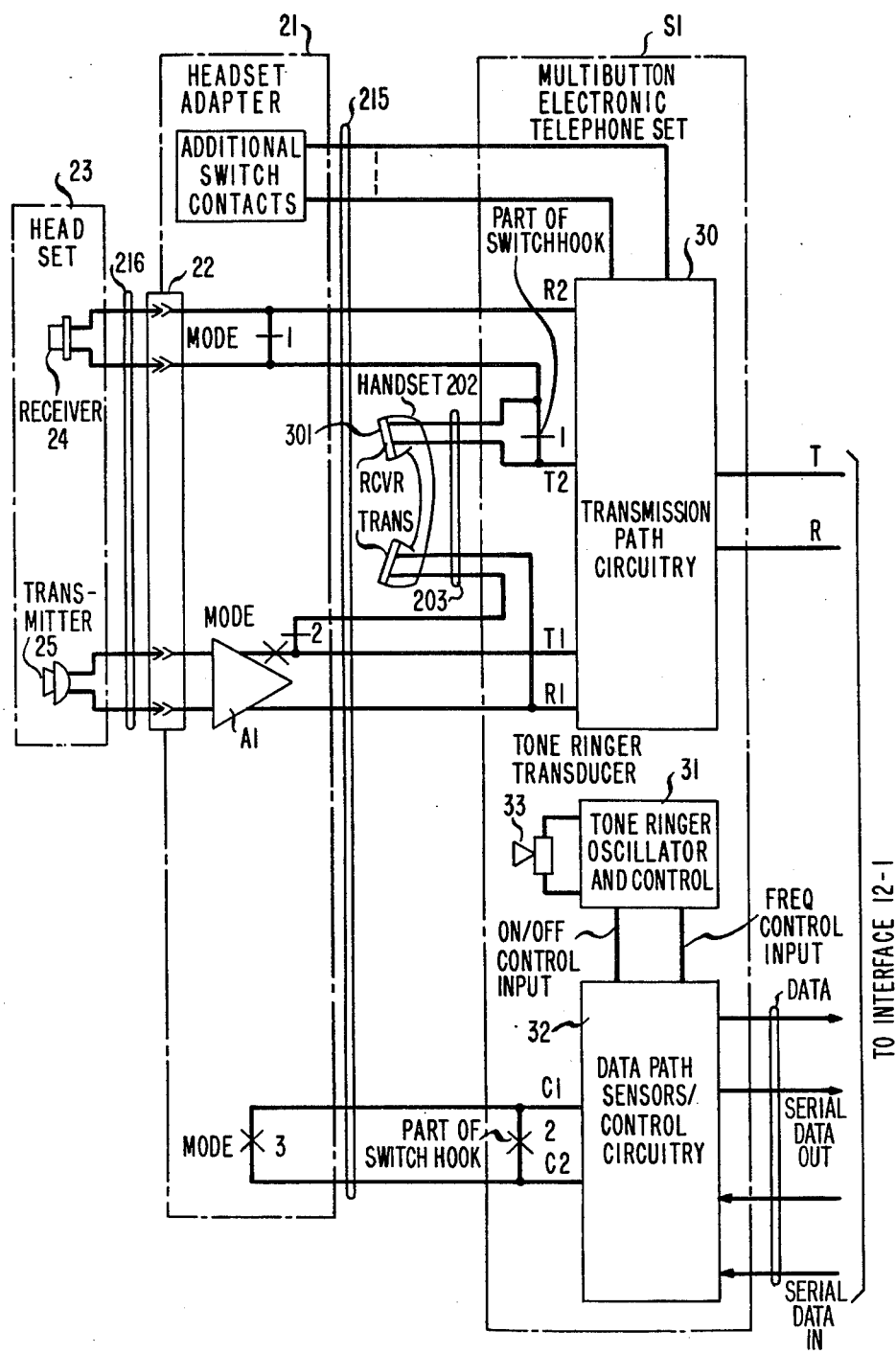
FIG. 3 shows in more detail a schematic of the transmission path and control circuitry for headset/handset operation.

Turning now to FIG. 3, there is shown a partial schematic of station S1 connected by cable 215 to adapter 21, which in turn is arranged to accept headset 23 via plug 22. The contacts shown in FIG. 3 are positioned as they would be with handset 202 in the on-hook position and headset 23 unplugged.

As shown, audio transmission to and from the station is via leads T and R through transmission path circuitry 30, and via lead T1 through break contact 2 of the mode switch in headset adapter 21, through transmitter 302 of handset 202 and via lead R1 and transmission path circuitry 30 to lead R. Contained within transmission path circuitry 30 is a standard hybrid for connecting the T and R leads to the mouthpiece (transmitter) and earphone (receiver) of handset 202. Thus, lead T2 is extended to receiver 301 of handset 202. Because the handset is on hook, lead T2 is extended via break contact 1 of the switchhook to receiver 24 in headset 23. Also because the mode switch is unoperated, there is a direct short between leads R2 and T2 caused by break contact 1 of the switchhook and break contact 1 of the mode switch.

The on-hook/off-hook status of station S1 is determined by sensor and control circuitry 32, which monitors leads C1 and C2. When a short occurs between these leads, either as a result of handset 202 going off hook (which closes contact 2 of the switchhook) or as a result of headset 23 being plugged in (which closes contact 3 of the mode switch) control circuitry 32 senses this condition and provides the appropriate signal on the path via the data to common control 14 via interface unit 12-1 for interpretation by processor 15 as discussed.

Continuing in FIG. 3, when the station is in the handset mode, broadcast ringing signals are applied to control circuitry 32 via the serial data in leads from interface 12-1. These signals are used to control tone ringer 33 transducer via control circuitry 31 in the manner previously discussed.

When the station goes off hook, switchhook 2 closes causing control circuitry 32 to send an off-hook signal over the serial data-out leads to common control 14 when this station is scanned. The off-hook status of handset 202 serves to open switchhook contact 1 thereby removing the short across leads T2 and R2 and allowing two-way audio conversation from the receiver and transmitter of handset 202 over the previously described communication path through transmission path circuitry 30 and the T and R leads via interface 12-1 to switching network 11.

Assume now that handset 202 is on-hook and headset 23 is plugged in. In this situation, the mode switch is operated and contact 3 is closed causing a short between leads C1 and C2. This short is communicated via control circuitry 32 to common control 14 as previously discussed. As will be seen from the discussion that will follow, it is this "permanent" off-hook condition of an idle station which is used by the system to distinguish between handset and headset operation. An open condition between leads C1 and C2 while the station is in the idle condition signifies handset operation, while a closed condition with respect to leads C1 and C2 signifies headset operation.

Following the assumed situation where headset 23 is plugged into headset adapter 21, leads C1 and C2 are closed. The T and R leads from interface 12-1 are connected through transmission path circuitry 30 and via leads T2 and R2 directly to receiver 24 in headset 23. Since the mode switch is operated, the short is removed from a receiver 24 via break contact 1 of the mode switch. At the same time, voice signals picked up from transmitter 25 are available via amplifier A1 and enabled transfer contact 2 of the mode switch and via the T1 and R1 leads and through transmitter path circuitry 30 to the T and R leads to the switching network.

As will be discussed, in response to an incoming call and a determination by the processor of headset operation, tone ringer 33 is not enabled, but instead, audio (zip) tone is applied over the audio communicating leads T and R to earphone 24 of headset 23.

Different audio tones or signals may be appropariate to signify different conditions. For example, a 500 ms burst of constant tone is typically used to signify a call incoming from a particular set of lines (split) while a stuttered audio tone (which may consist of three 100 ms tones, each separated by 100 ms of silence) could signify an incoming call arriving from a different set of incoming lines connected to common control 14. In either event, the audio tone is only applied for a certain length of time and immediately thereafter the calling party is connected through without necessity of button or switchhook manipulations by the attendant.

When the calling connection is disconnected, either by the calling station going on-hook or by the attendant taking some action, the call is terminated. It must be kept in mind that in headset operation the station appears permanently off-hook to the switching system, and thus, there is no on-hook condition to signify the end of a call. Thus, while in headset operation, to terminate a call, the attendant must perform some other button operation which is interpreted by common control 14 as a specific termination of the call. If no such special action is taken by the attendant, processor 15 places the station in a special after work mode. In this mode calls are not completed to the station. This operation serves to prevent incoming calls from being completed to a telephone station at which the handset has been permanently removed from the switchhook or at which the headset is plugged in, but unattended unless this special signal is received after each completed call.

Figure 4:
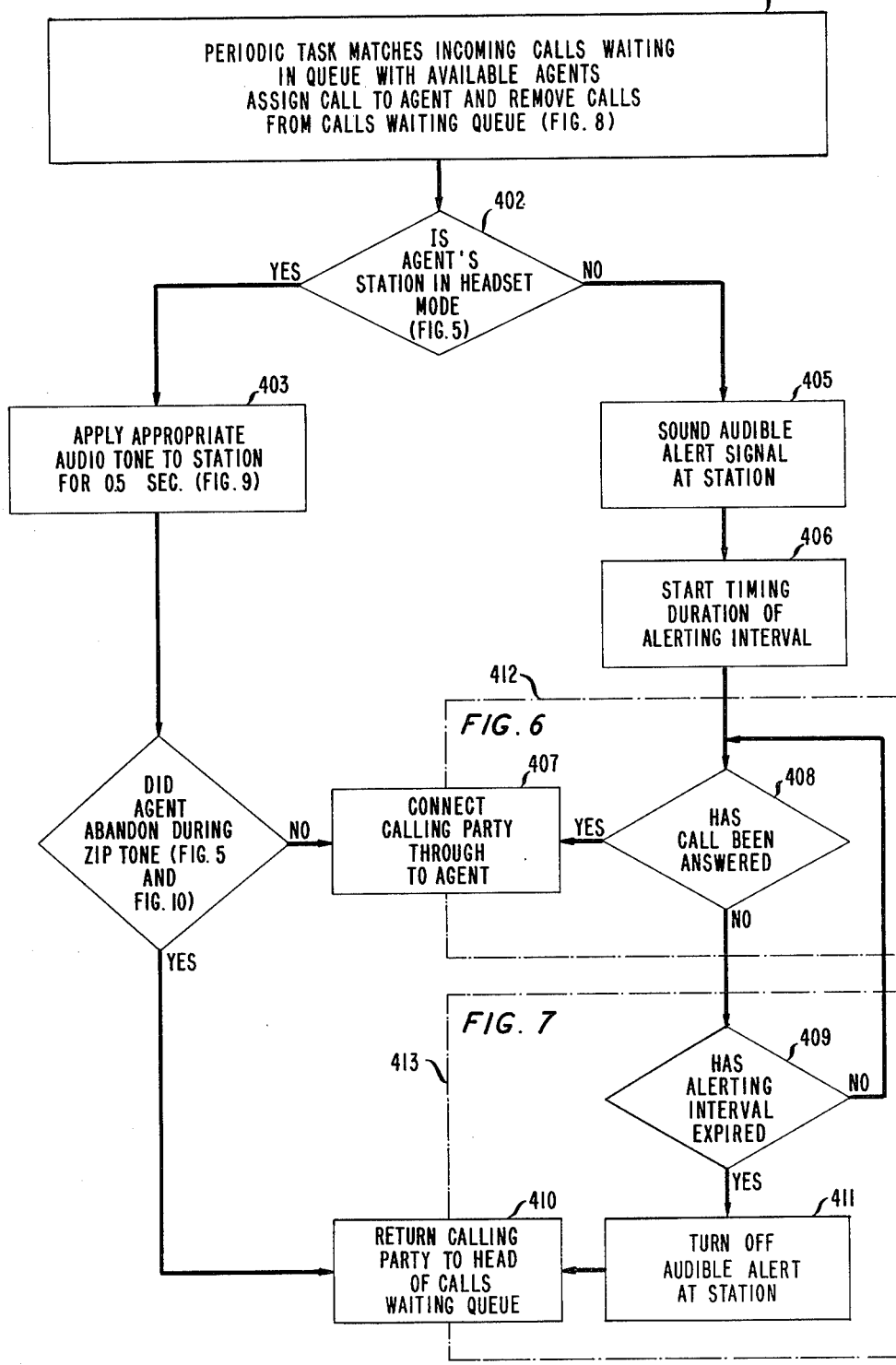
FIGS. 4–10 show flow charts of the manner of controlling the headset/handset operation of the described system.
Figure 8:
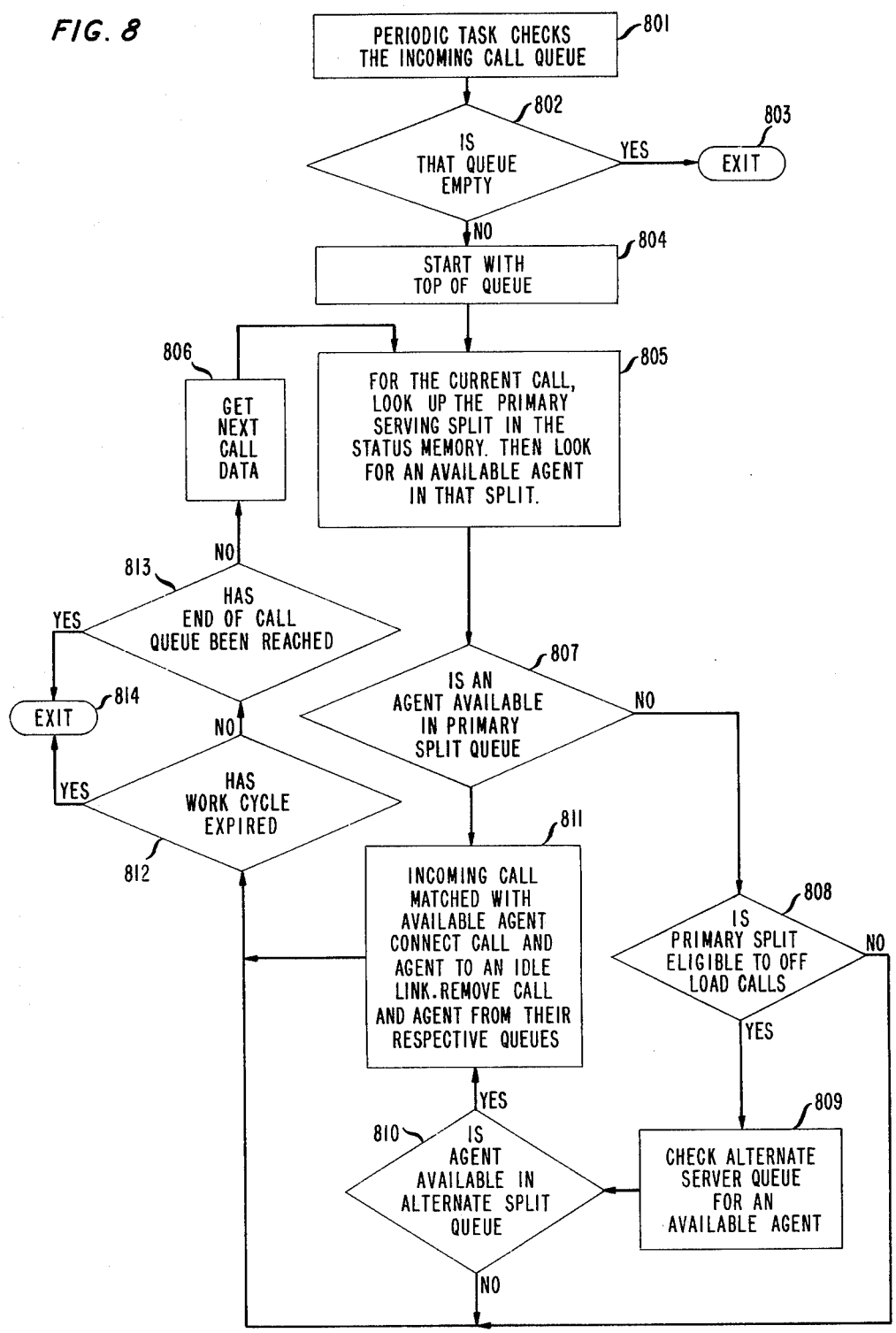

FIG. 4 is a flow chart showing the processes within common control 14 which serves to control the handset headset operation. Process 401, which is further detailed in FIG. 8, is the process whereby the system examines the incoming calls queue and the available agent queue and assigns the calls at the top of the queue to available agents at specific stations.

There are several well-known methods for accomplishing this task. One such is by queuing with a first incoming call being connected to the first available agent and so forth. The queuing arrangement may be more sophisticated where the agents are divided into splits, with each split handling certain types of incoming calls. An increased level of sophistication then would be to dynamically rearrange the splits as the availability of agents changes and number of calls incoming from different lines change. Such a sophisticated call queuing arrangement is shown in FIG. 8.

Once it is determined that a call is to be directed to a specific station, a first determination must be made, as shown in box 402, as to whether the station is in the headset or handset mode. As discussed priorly, and as detailed more fully in FIG. 5, the status of the station is checked, i.e., the on-hook/off-hook condition is determined. Thus, as shown in FIG. 5, there is established a table which contains the status of all of the stations at any time. It is this table which is used to control the determination of the on-hook/off-hook status at a particular station at a particular time.

Figure 9:
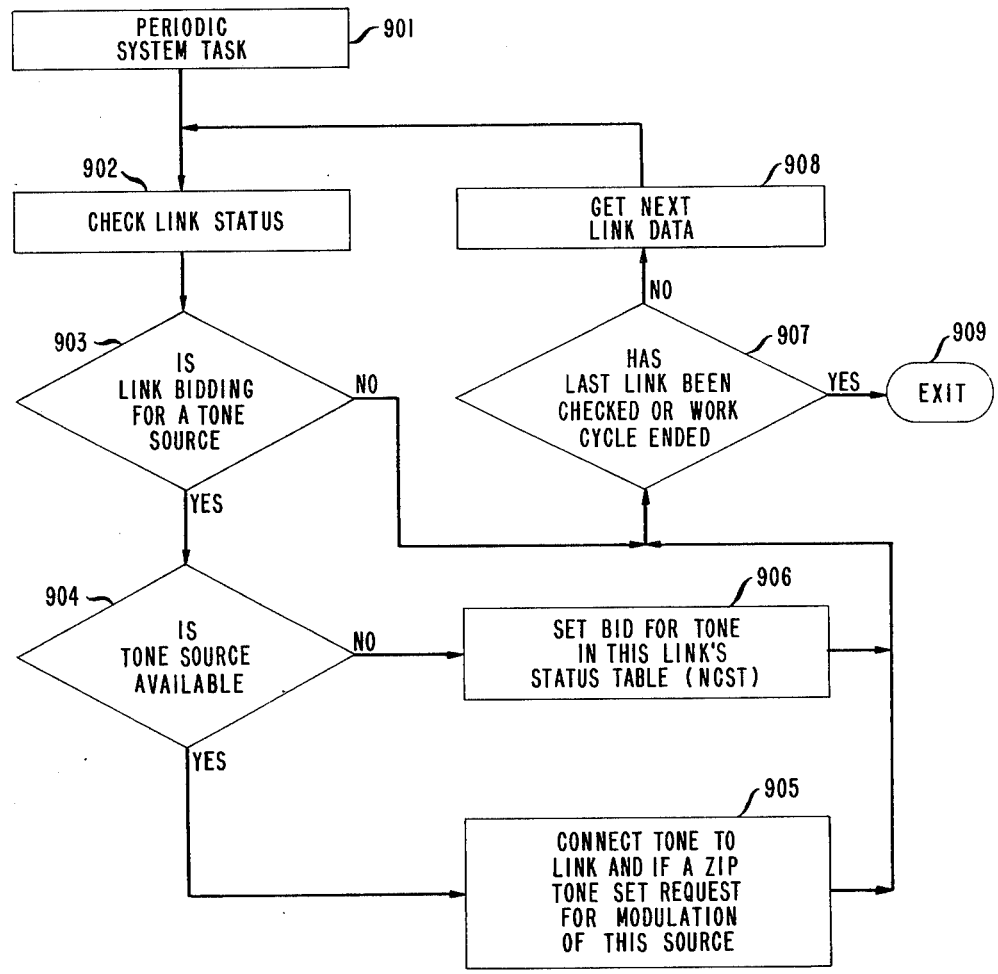

Returning to FIG. 4, and assuming the headset mode, the system then applies the appropriate audio (zip) tone for 0.5 seconds. The method implemented by the common control unit, 14, to find, modulate and finally terminate the appropriate zip tone, boxes 403 and 404, is described in FIGS. 9 and 10. As priorly discussed, this audio tone can be constant or can be the stuttered, depending upon information received from the dequeuing process of FIG. 8. If the agent assigned to ths call is in the primary serving split for the line involved the constant zip tone is selected. On the other hand, if the agent assigned is in other than the primary serving split for that line, the stuttered zip tone is selected. A bid request for the selected tone type is entered in the status memory, 16-2, data structure, NCST (link change status and timing table). The element of that structure where the request is entered is governed by the link which has been assigned to the call being serviced. FIG. 9 describes the tone selection process and FIG. 10 describes the tone modulation and termination process. At the conclusion of the zip tone and as part of the tone termination process, a second determination is made, again under the control of the process of FIG. 5, as to whether or not the attendant's headset still remains plugged into the station.

If the headset has been unplugged, it is assumed that the attendant has abandoned the station and the call is returned to the head of the queue as shown in process 410. If the agent's headset remains plugged into the station at the end of the zip tone, then the calling party is connected to the agent in the manner previously described and as shown in process 407.

Now let us assume that there is a determination made by box 402 that the agent's station is in the handset mode. Under this situation, process 405 enables the audible alert signal at the station in the manner previously discussed such that data bits are sent via the data bus from common control 14 to control circuit 32, FIG. 3, for control of tone ringer transducer 33. At the same time, process 406 starts timing the duration of the alerting interval by making an entry into the NCST array. During the ringing or alerting interval processor 15 is busy handling many other functions, one of which being the process of FIG. 5. The process of box 412 is shown in more detail in FIG. 6, and the process of box 413 is shown in more detail in FIG. 7. As an overview of these processes it will be seen, from FIG. 4, that it is necessary to first determine if the call has been answered. This is shown in box 408. Obviously, if the answer is yes, then a communication connection is made to the called agent. If the answer is no and if the alerting interval has not expired, as shown in box 409, then the reiterative loop continues until such time as the call has been answered or the alerting interval has expired.

If the alerting interval expires prior to answer, then the audible alerting will terminate box 411 and the calling party is returned to the head of the queue. If a call is returned to the incoming call queue in memory 16-2 (IN_CL_Q) in this manner, processor 15 places the station in a special after work mode. As described earlier, in this mode calls are not completed to the station. This method of operation serves to prevent another incoming call from being assigned to a station in handset mode left unattended and in the available agent queue (AV_AG_Q), in memory 16-2.

Figure 6:
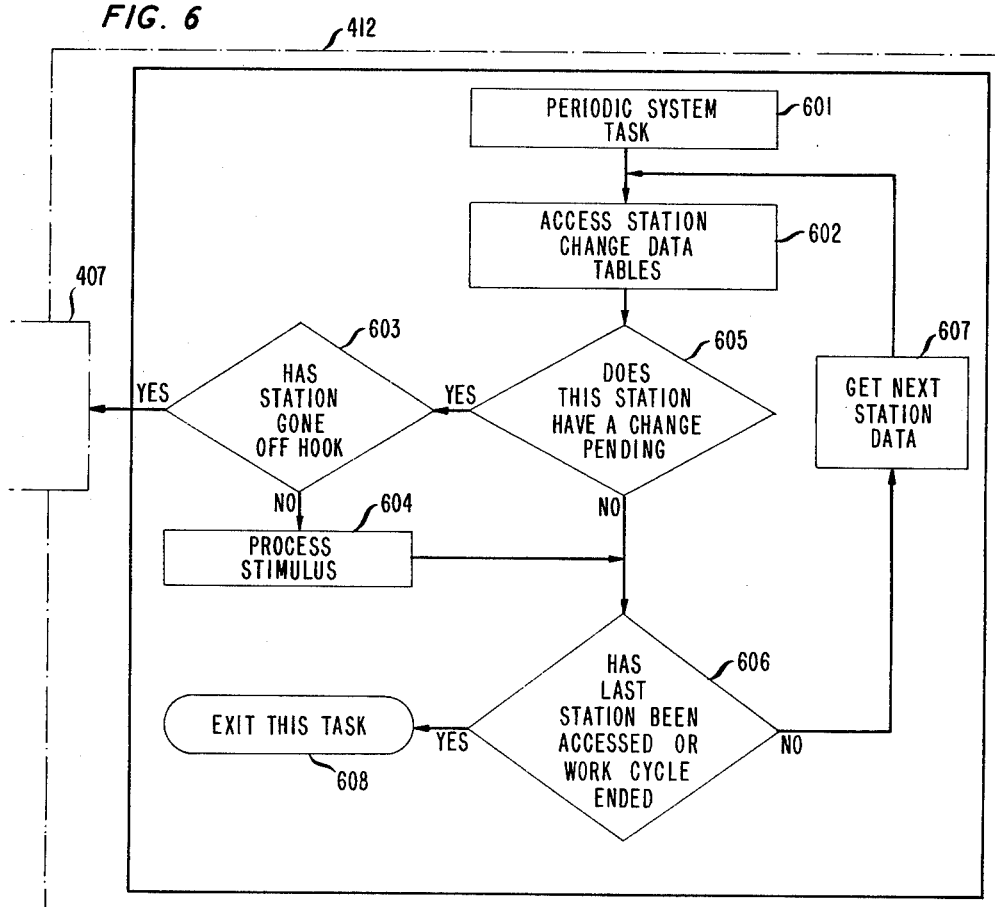

Turning now to FIG. 6, system task 601 monitors the status of this station on a periodic basis so that processor 15 need not wait for a response but is free to handle other stations. This task is performed by accessing the system change data tables SEIO process 602 as constructed under task 501, FIG. 5. If a determintion is made that the status of the station has changed, box 605, then a further determination must be made as to whether or not the station has gone off-hook, box 603. If the answer is yes, then there is an exit to box 407 (FIG. 4) thereby connecting the calling party to the agent for communication purposes. If, on the other hand, the answer is no, which could occur if there has been a station change, such as a button push, then a reiteration occurs, boxes 604, 606, such that the station is not answered, the visual ringing indication (flashing status LED at IN key) continues and the audible ringing signal is silenced. Periodic system task 601 continues until the last station has been accessed or the current work cycle ends and then this task is exited via process 608.

Figure 7:
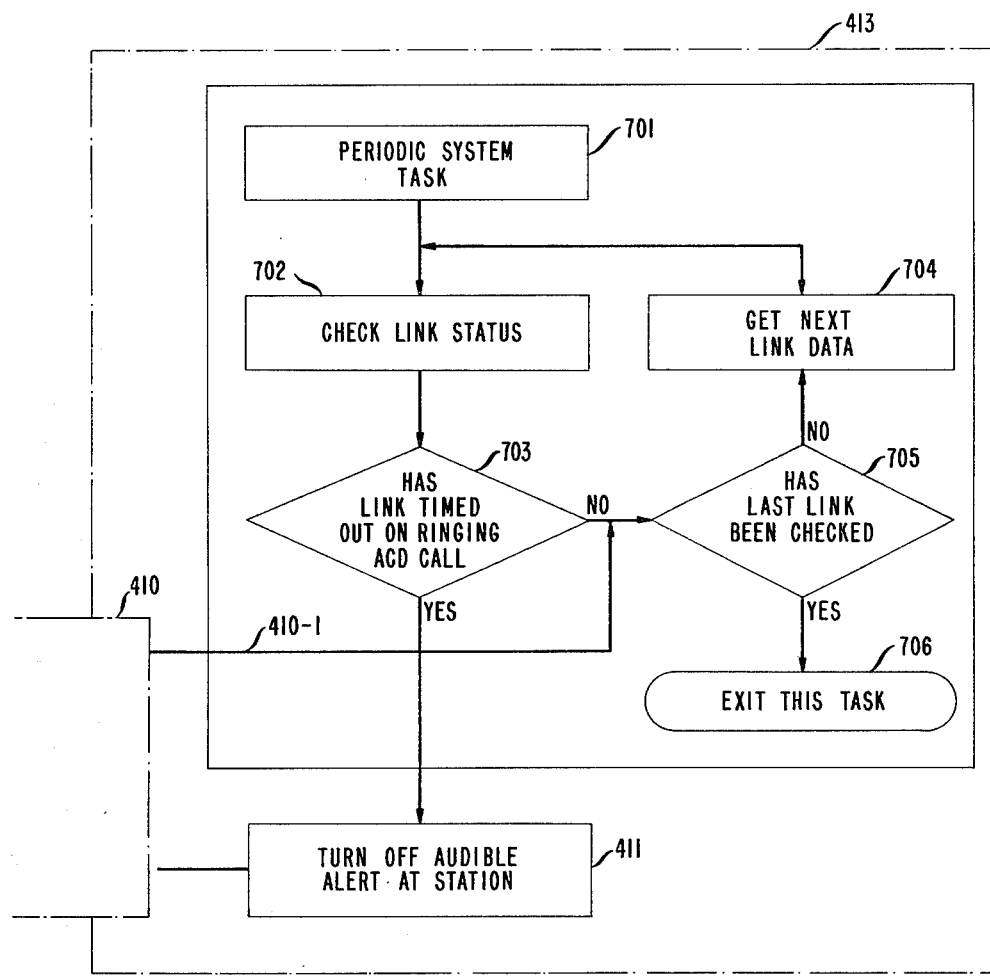

The control of the alerting interval is shown in FIG. 7, where the periodic system task 701 checks the link status held in status memory data structure NCST, box 702, to determine whether there has been a time-out on an ACD call which is being alerted, process 703. If the answer is yes, the audible alert at the station is turned off, box 411, and the process of box 410 returns the calling party to the head of the queue. This process also provides a signal, lead 410-1, which continues the reiteration of periodic system task 601 for other links. When all links have been checked, this task is exited via box 706.

FIG. 8 shows a flow diagram of the call dequeuing process. However, before discussing the de-queuing a brief description of the queuing procedure is given. When a line circuit makes the transition from the idle state to the ringing state, translation memory is checked. If the line making the transition is designated to be an ACD line, that line is added to the incoming call queue data structure (IN_CL_Q), in status memory 16-2. Normally the line would be added to the bottom of the queue. However, if the line is designated to receive priority treatment by its translation memory entry, the line will be added to the queue, at the head of the queue or if there already are priority treatment lines in the queue, behind the most recent entry but ahead of any non-priority treatment lines which may be present in the queue.

Agents signify their availability to receive calls by pressing one of the flexible buttons on their MET station set. That button position, called the IN KEY, is specified in the translation data structure SAFB. When the agent presses the IN KEY, that station is added to the available agent queue (AV_AG_Q). The periodic tasks of FIGS. 5 and 6 detect and process the agent's IN KEY command. Stations are associated by translation entries with splits. The available agent queue is also divided by split.

Returning now to FIG. 8, system task 801 is entered periodically where the status of the $IN_{13}CL\_Q$ data structure is checked. If no calls are waiting for service the "YES" branch from decision box 802 is taken and this task exits through process 803. When calls are found waiting for service process 804 is entered where the queue search parameters are initialized to start the servicing work at the head of the queue.

In process 805, the primary serving split for the current call is determined from the status memory data structure, line ACD split table (L_ACDS). The available agent queue (AV_AG_Q) for that split is then checked for an available agent. A decision is made in process block 807 based on the status data investigated in 805.

If an available agent is found in the primary split, process 811 is executed. The agent and the line are both connected to an idle link and removed from their respective queues. The operations of FIG. 4, explained earlier, are then executed.

Processes 812 and 813 provide tests to exit (process 814) this task and/or an iteration path to continue servicing calls in the queue via process 806.

If in process 807, it is determined that no agent is available in the primary serving split, the "no" branch is taken from 807 to process 808. In 808 the condition of this split is compared to the call intra-flow criteria for this split. If these criteria are not met, the processing continues at block 812 and proceeds as previously described. However, in cases where the intra-flow criteria are met, processing continues in block 809. In 809 the alternate split to which calls may be off-loaded are determined. Then, that alternate split is polled for available agents. In decision block 810 processing branches either to block 811 or block 812. Processing in and from both of these blocks has already been described.

FIG. 9 shows in more detail how the common control unit implements the first part of FIG. 4, process 403, i.e., how the appropriate zip tone source is found and applied to the link which contains the incoming call and the agent assigned to the call. The agent and call were connected to the link in FIG. 8, block 811. Based on whether or not the agent assigned the call is in the primary serving split, process 403 sets a bid in the link's NCST table element for a constant or a stuttered zip tone source. This periodic task referred to in FIG. 9 is the same task initiated in FIG. 7. The differences in the flow charts in these two figures result from the stimulus data found in the NCST table when this task is entered. FIGS. 7 and 9 are simplified flow charts of the process. They are shown in simplified form for clarity, avoiding detail not relevant to this patent aplication. The periodic system task initiated in block 901, FIG. 9, processes the stimuli found in the NCST table. Search parameters are set to access the first element of that table in 901. In 902 the current element is evaluated for stimulus.

In decision block 903, if it is determined that this link is bidding for a tone source the branch to block 904 is taken. In 904 the available tone sources are polled to determine if a source of the desired type is available. If an available source is found the exit branch to process 905 is taken. In 905 the available source is connected to the link and if the tone is a zip tone a request for modulation of that tone source is logged by setting a flag in a data structure called ZIP_ON for modulation as a constant zip tone or in a data structure called ZIP_SDR for modulation as a stuttered zip tone.

Figure 10:
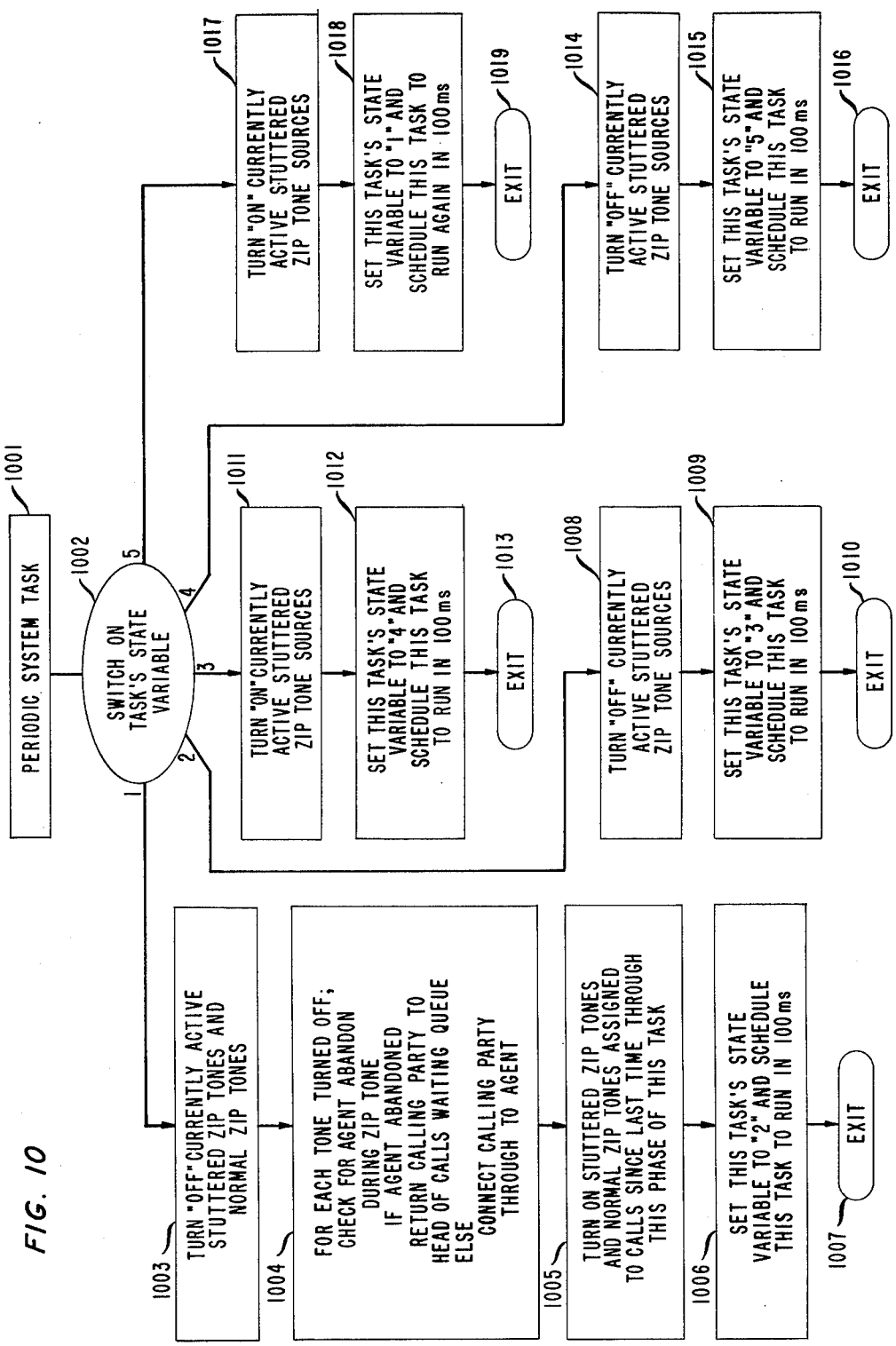

The modulation of the zip tone sources is done by another periodic system task described in FIG. 10. That task is discussed later in this document.

Upon completion of process block 905, the iteration and exit control blocks 907, and 908 or 909 are executed.

Returning now to decision block 904, if a tone source of the desired type is not found the branch to process 906 is taken. In 906, the bid for the desired type tone is entered in the current link's element of the NCST data structure. THe next time the periodic system task of FIG. 9 is entered another attempt will be made to find an idle tone source. This procedure, search and set a bid when no available sources are found, continues until a tone source of the desired type is made available by other system processes. Upon completion of process block 906, the iteration and exit control blocks 907, and 908 or 909 are executed.

FIG. 10 shows how the common control (FIG. 1, 14) implements the zip tone timing and modulation (referred to in FIG. 4, process 403), and the zip tone termination process (FIG. 4, processes 404, 407, 410).

Beside handling modulation and termination of zip tone sources, the periodic system task of FIG. 10 also handles other system timing tasks such as modulation of the "busy" tone sources and computing the instantaneous lamp state for the LEDs. FIG. 10 is a simplified flow diagram, in which only the zip tone related processing is shown. This approach is taken for clarity.

This periodic system task is entered at process block 1001. In 1001 the task's state variable, LMP_STA is range checked, set to 1 if out of range, and then acted upon in block 1002. In 1002 the value in LMP_STA determines which branch is to be executed. When the system is initially powered on the state variable, LMP_STA is cleared (i.e., set to zero). Therefore, the first time process 1001 is entered after power up the state variable LMP_STA is set to one and process 1002 steers execution to process 1003.

In process 1003, the currently active constant and stuttered zip tone sources are turned off. The flags in arrays ZIP_OFF point to the constant tones to be turned off and the flags in ZIP_SIP (zip tones, stuttered in process) point to the stuttered tone sources to be turned off. On power up both these flag arrays are cleared, so the first time through process 1003 after power up, there are no zip tone sources to be turned off. When there are active zip tone sources, these two flag bytes are set in process 1005.

In process 1004, the switchhook status of the agent associated with each terminated zip tone source is checked. The current status is maintained in the data structure SEIO by the periodic system task in FIG. 5.

If the switchhook status shows "on hook" at this point, the agent has abandoned between the time the call was assigned and zip tone modulation completed. In that case, the calling party is returned to the head of the incoming call queue (IN_CL_Q data structure) i.e., in FIG. 4 the branch from process 404 to 410 is executed.

Alternatively, if the switchhook status shows "off hook" at this point, the calling party is connected through the agent, i.e., in FIG. 4 the branch from process 404 to 407 is executed. The flag in ZIP_OFF or ZIP_SIP is cleared, as each tone's associated agent is checked and the pending call disposed of.

When process 1004 completes, process 1005 is entered. In 1005, the zip tone modulation cycle is started. Requests to modulate zip tone sources are stored in two flag arrays, ZIP_ON for constant zip tone modulation and ZIP_SDR for stuttered tone modulation. These request to modulate flags are set in FIG. 9, process 905, which was previously discussed. When the constant zip tone sources requested in ZIP_ON have been turned on, corresponding flags in ZIP_OFF are set so that these tones may be terminated the next time processes 1003 and 1004 are executed. The ZIP_ON flags which have been serviced are then cleared. The tone sources pointed to by the flags in array ZIP_SDR are also turned on. The corresponding flags in the array ZIP_SIP are set and the stuttered zip to modulation request flag array, ZIP_SDR, is cleared.

At the conclusion of process 1005, process 1006 is entered. This process updates this task's state variable, LMP_STA, to a value of 2. Therefore, the next time this task is entered, the branch labeled 2 from process 1002 leading to process 1008 will be taken. Process 1005 also schedules FIG. 10's periodic system task to run again in 100 milliseconds. This task then exits via process 1007.

When 100 milliseconds has elapsed and the periodic system task of FIG. 10 is re-entered, its state variable is set to 2. Therefore, the branch from process 1002 to 1008 is executed when 1002 is reached.

In 1008 the zip tone sources pointed to by the flag array ZIP_SIP are turned off. These tones have completed their first 100 millisecond "on" burst and enter a 100 millisecond silent period at this point. If no flags are set, no zip tones are turned off.

In process 1009, the task's state variable, LMP_STA is set to 3 and this task is scheduled to run again in 100 milliseconds. This task then exits via 1010.

When another 100 milliseconds has elapsed and FIG. 10's tasks is re-entered the branch from 1002 to 1011 is executed when 1002 is reached.

In process 1011 the zip tone sources pointed to by the flag array ZIP_SIP are turned on to begin their second 100 millisecond "on" burst, having just completed their first silent interval.

Process 1012 sets LMP_STA to 4 and schedules this task to run in 100 milliseconds. This task then exits via 1013.

Similarly the periodic system task of FIG. 10 steps through the branches from 1002 labeled 4 and 5. Upon executing process 1018 in branch 5, LMP_STA is set to 1 and the entire procedure begins again.

CONCLUSION

While the invention has been set in a processor controlled telephone system, those skilled in the art may develop a communication system using other technologies without departing from the spirit or scope of the invention. In addition, it should be obvious to one skilled in the art that differing alerting signals can be supplied to a telephone station for reasons other than the insertion of a headset and the claims of this invention should not be limited to the precise structure shown.

What is claimed is:

1. A communication system having a plurality of telephone stations operable for completing communication connections thereto, said system comprising means for providing at a called station a broadcast signal indicating the presence of an incoming connection to said station, means controlled by an answer signal from said station subsequent to said provided broadcast signal for establishing a communication connection to said station, means for monitoring said station to determine if said station is in one particular mode or an alternate mode, means operative when said station is determined to be in said alternative mode for inhibiting said provided broadcast signal and for providing instead a pretimed signal, and means operative at the conclusion of said pretimed signal for establishing said communication connection to said station without regard to said answer signal.

2. The invention set forth in claim 1 wherein said station includes means for accepting a headset plug, and wherein said alternative mode is controlled by the acceptance of said headset plug.

3. The invention set forth in claim 2 wherein said headset plug accepting means places said station in an apparent permanent off-hook status upon accepting said headset plug.

4. The invention set forth in claim 3 wherein said broadcast signal is produced at said station as a result of control signals provided over data leads to said station and wherein said pretimed signal is received by said headset via said station.

5. The invention set forth in claim 1 further comprising means for determining at the conclusion of said pretimed signal whether or not said station is still in said alternate mode, and means for redirecting said incoming communication connection if said station is determined to be no longer in said alternate mode at said conclusion of said pretimed signal.

6. A system for providing both handset and headset operation for a telephone station, said system comprising means for determining if said station is in a handset or a headset operational mode, means for providing to said station either first or second distinctive signals indicative of an incoming communication connection, and means controlled by said determining means on a per call basis for enabling said first distinctive signals if said station is determined to be in said handset mode and for enabling said second distinctive signals if said station is determined to be in said headset mode.

7. The invention set forth in claim 6 wherein said determining means includes means for making said station appear off-hook to said system when said station is in said headset mode.

8. The invention set forth in claim 6 wherein said first distinctive signals are produced by a ringer enabled from data signals provided from said system and wherein said second distinctive signals are produced by a receiver in response to audio frequency signals provided from said system.

9. The invention set forth in claim 6 wherein said second distinctive signals are pretimed, and further comprising, means responsive to an off-hook condition of said station after the provision of said first distinctive signals for establishing a communication path to said station, and means responsive to the end of said pretimed signals after the provision of said second distinctive signals for automatically establishing said communication path.

10. The method of providing both handset and headset operation for a telephone station, said method comprising the steps of determining if said station is in a handset or a headset operational mode, providing to said station either first or second distinctive signals indicative of an incoming communication connection, enabling said first distinctive signals if said station is determined to be in said handset mode, and enabling said second distinctive signals if said station is determined to be in said headset mode.

11. The invention set forth in claim 10 wherein said determining step includes making said station appear off-hook to said system when said station is in said headset mode.

12. The invention set forth in claim 10 wherein said first distinctive signals are produced by a ringer enabled from data signals provided from said system and wherein said second distinctive signals are produced by a receiver in response to audio frequency signals provided from said system.

13. The invention set forth in claim 10 wherein said second distinctive signals are pretimed, and wherein said method further includes the steps of establishing a communication path to said station in response to an off-hook condition of said station after the provision of said first distinctive signals, or automatically establishing said communication path in response to the end of said pretimed signals after the provision of said second distinctive signals.

* * * * *